(12) United States Patent
Naumann

(10) Patent No.: US 11,338,369 B2
(45) Date of Patent: May 24, 2022

(54) UNDERFLOOR WHEEL SET PROCESSING MACHINE, IN PARTICULAR UNDERFLOOR WHEEL LATHE WITH ADJUSTABLE TRACK WIDTH

(71) Applicant: Hegenscheidt-MFD GmbH, Erkelenz (DE)

(72) Inventor: John Oliver Naumann, Wassenberg (DE)

(73) Assignee: Hegenscheidt-MFD GmbH, Erkelenz (DE)

( * ) Notice: Subject to any disclaimer, the term of this patent is extended or adjusted under 35 U.S.C. 154(b) by 251 days.

(21) Appl. No.: 16/649,196

(22) PCT Filed: Aug. 21, 2018

(86) PCT No.: PCT/EP2018/072486
§ 371 (c)(1),
(2) Date: Mar. 20, 2020

(87) PCT Pub. No.: WO2019/057420
PCT Pub. Date: Mar. 28, 2019

(65) Prior Publication Data
US 2020/0222988 A1 Jul. 16, 2020

(30) Foreign Application Priority Data
Sep. 22, 2017 (DE) ...................... 10 2017 122 023.2

(51) Int. Cl.
*B23B 5/32* (2006.01)
*B23B 5/28* (2006.01)
(52) U.S. Cl.
CPC . *B23B 5/32* (2013.01); *B23B 5/28* (2013.01)

(58) Field of Classification Search
CPC .. B23B 5/32; B23B 25/06; B23B 5/28; B23Q 9/0078; Y10T 82/10; Y10T 82/185; Y10T 82/18
See application file for complete search history.

(56) References Cited

U.S. PATENT DOCUMENTS 3,256,754 A * 6/1966 Rivierre .................. B23B 33/00
408/241 R
3,345,891 A 10/1967 Dombrowski
(Continued)

FOREIGN PATENT DOCUMENTS

CN 101125370 B 11/2010
CN 204194807 U 3/2015
(Continued)

*Primary Examiner* — Sara Addisu
(74) *Attorney, Agent, or Firm* — The Webb Law Firm

(57) ABSTRACT

Represented and described is an underfloor wheel set processing machine, in particular an underfloor wheel lathe (1') for reprofiling wheels and brake discs of wheel sets (20) of rail vehicles, comprising: a machine stand (3), a crossbeam (2) for bridging a workshop track (4) with at least two rails (4A, 4B, 4C) in the transverse direction, two roller carriers (7A, 7B), at least four friction rollers (8), at least one friction roller drive (9) to drive the friction rollers (8) and at least one axial guide roller (19) to axially guide the wheel set (20), wherein the machine stand (3) has a first part (3A) and a second part (3B), wherein the crossbeam (2) is supported on both parts (3A, 3B) of the machine stand (3), wherein the roller carriers (7A, 7B) are movably connected to the machine stand (3), and wherein the friction rollers (8) are rotatably supported on the roller carrier (7A, 7B). In order to adjust to wheel sets (20) with different track widths, it is proposed for the first part (3A) of the machine stand (3) and the second part (3B) of the machine stand (3) to be displaceable relative to one another in the transverse direction.

11 Claims, 7 Drawing Sheets

(56) References Cited

U.S. PATENT DOCUMENTS

| | | | | |
|---|---|---|---|---|
| 3,598,017 | A * | 8/1971 | Saari | B23B 31/00 409/165 |
| 4,276,793 | A * | 7/1981 | Wirtz | B23B 5/32 82/1.11 |
| 4,347,769 | A * | 9/1982 | Dombrowski | B23B 5/32 82/104 |
| 4,399,724 | A * | 8/1983 | Dombrowski | B23B 5/32 82/104 |
| 4,674,369 | A * | 6/1987 | Gutohrlein | B23B 5/32 82/104 |
| 4,951,534 | A * | 8/1990 | Brinkmann | B23B 5/32 82/105 |
| 5,678,963 | A * | 10/1997 | Heimann | B23B 5/32 33/1 Q |
| 8,171,829 | B2 * | 5/2012 | Thyni | B61K 5/00 82/105 |
| 10,946,451 | B2 * | 3/2021 | Maldaner | B23B 9/08 |
| 2010/0005935 | A1 * | 1/2010 | Ross | B23B 5/32 82/105 |
| 2013/0042731 | A1 * | 2/2013 | Ross | B23B 5/32 82/1.11 |
| 2013/0112052 | A1 * | 5/2013 | Reiche | B23B 5/32 82/105 |

FOREIGN PATENT DOCUMENTS

| | | |
|---|---|---|
| DE | 1261372 A | 2/1968 |
| DE | 20214942 U1 | 12/2002 |
| DE | 20319063 U1 | 4/2004 |
| DE | 102006007137 A1 | 8/2007 |
| JP | 2002011602 A | 1/2002 |
| JP | 2009056550 A | 3/2009 |
| RU | 2107586 C1 | 3/1998 |
| RU | 51545 U1 | 2/2006 |
| RU | 71280 U1 | 3/2008 |
| RU | 128534 U1 | 5/2013 |
| WO | 02094485 A2 | 11/2002 |

* cited by examiner

UNDERFLOOR WHEEL SET PROCESSING MACHINE, IN PARTICULAR UNDERFLOOR WHEEL LATHE WITH ADJUSTABLE TRACK WIDTH

CROSS-REFERENCE TO RELATED APPLICATIONS

This application is the United States national phase of International Application No. PCT/EP2018/072486 filed Aug. 21, 2018, and claims priority to German Patent Application No. 10 2017 122 023.2 filed Sep. 22, 2017, the disclosures of which are hereby incorporated by reference in their entirety.

BACKGROUND OF THE INVENTION

Field of the Invention

The invention relates to an underfloor wheel set processing machine, in particular an underfloor wheel lathe for reprofiling wheels and brake discs of wheel sets of rail vehicles, comprising: a machine stand, a crossbeam for bridging a workshop track with at least two rails in the transverse direction, two roller carriers, at least four friction rollers, at least one friction roller drive to drive the friction rollers and at least one axial guide roller to axially guide the wheel set, wherein the machine stand has a first part and a second part, wherein the crossbeam is supported on both parts of the machine stand, wherein the roller carriers are movably connected to the machine stand, and wherein the friction rollers are rotatably supported on the roller carrier.

Description of Related Art

Underfloor wheel lathes are known in different configurations from the prior art, for example from DE 10 2006 007137 A1 or DE 202 14 942 U1 from the same applicant.

Normally, underfloor wheel lathes are arranged like other wheel set processing machines in a pit below a workshop track. The wheel sets to be reprofiled are fitted via the workshop track in a rail vehicle or introduced into the machine by crane in the removed state. For the reprofiling of the wheels, like the brake discs, the wheel sets are driven by two by two friction rollers on the running surfaces. At the same time, the wheel sets are held on their axle bearing housings by fixings. To achieve processing accuracy that is as high as possible, whilst taking into account a high dynamic rigidity of the underfloor wheel lathe, the wheel sets are for example centred on their axle bearing housings and guided via axial guide rollers in the axial direction.

Such underfloor wheel lathes are for example suitable for:
the turning of the wheels from the running surfaces to the wheel flange and the wheel flange rear side,
the profile processing and the processing of the inner wheel end faces,
a one-sided reprofiling of a wheel set,
the processing of shaft brake discs and also of wheel brake discs, and
the processing of the external side surface of the wheel profile.

The Chinese utility model CN 101125370 A from the same applicant shows for example an underfloor wheel lathe for reprofiling wheels and brake discs of wheel sets of railway vehicles. The underfloor wheel lathe described there is characterised in that the underfloor wheel lathe has a horizontal crossbeam, which rests on two stationary machine stands, which are located on the floor below a workshop track by the crossbeam extending at a right angle transverse to the workshop track and protruding with its two outer ends in each case laterally over the workshop track, wherein the crossbeam has an approximately rectangular cross-section, whose upper side is below the workshop track and supports holders for two axial guide rollers for a wheel set, and of which one longitudinal side has two horizontal longitudinal guides, which run parallel to one another and have a vertical distance from one another and into which two workshop supports and two fixings for the bearing housing of the wheel set are guided in a linearly movable manner, while in each case one friction roller drive for in each case two rotatably drivable friction rollers is provided on the two outer ends of the crossbeam, which act on the running surface of each wheel of the wheel set.

A disadvantage of this underfloor wheel lathe is that an easy adjustment to different track widths is not provided. The distance between the tracks is designated as the track width in rail transport, usually between the inner edges of the rail heads of a track. Internationally, very different track widths are traditionally used for economic and military reasons. In the Federal Republic of Germany, the standard track width ("standard gauge") is for example 1435 mm. Different track widths can be used even within a state, for example in the case of narrow gauge railways in comparison to standard gauge railways. The wheel sets of rail vehicles are designed for use on a certain track width with a few exceptions. Therefore, underfloor wheel lathes with fixed, non-adjustable track width offers only a limited field of use.

Against this background, the object of the invention is to provide a wheel set processing machine that can be used in a versatile manner, in particular a wheel lathe which can be easily adjusted to wheel sets with different track widths.

SUMMARY OF THE INVENTION

This object is achieved in the case of an underfloor wheel set processing machine, in particular an underfloor wheel lathe according to the preamble of claim 1 in that the first part of the machine stand and the second part of the machine stand are displaceable relative to one another in the transverse direction.

The invention relates to an underfloor wheel set processing machine, in particular an underfloor wheel lathe for reprofiling wheels and brake discs of wheel sets of rail vehicles. In addition to wheel lathes, wheel set milling machines and wheel lathe milling machines are also for example considered as wheel set processing machines since an adjustment to different track widths can also be advantageous there. The invention is explained below by way of example using an underfloor wheel lathe. The reprofiling of wheels and brake discs is necessary at regular intervals since the surfaces to be processed, for example the running surfaces of the wheel discs, change shape after some time due to wear. The underfloor wheel lathe firstly comprises a machine stand, which may serve to arrange the underfloor wheel lathe on a ground, for example a pit below a workshop track. The machine also comprises a crossbeam to bridge a workshop track with at least two rails in the transverse direction. The transverse direction is understood as a direction which runs at right angles to the direction of the track and its rails and therefore runs parallel to the axial direction of the wheel set to be processed. "Bridging" simply means an extension over the width of the track; the crossbeam generally runs under the track. The machine stand has a first part and a second part; it is thus formed in two parts or multiple parts. The crossbeam is supported on both parts of the machine stand, for example recesses for the crossbeam are provided in both parts of the machine stand. The two parts of the machine stand are intended to be arranged on opposing sides of the machine, the first part of the machine stand should thus be assigned for example to the left rail and the second part of the machine stand should be assigned to the right rail. The machine further comprises two roller carriers and at least four friction rollers. The roller carriers serve to support the friction rollers which in turn serve to support the wheel discs of the wheel set to be processed. The roller carriers are movably connected (for example so as to be height-adjustable) to the crossbeam and the friction rollers are rotatably supported on the roller carrier. The machine also comprises at least one friction roller drive to drive the friction rollers and at least one axial guide roller to axially guide the wheel set.

According to the invention, provision is made for the first part of the machine stand and the second part of the machine stand to be displaceable relative to one another in the transverse direction.

The underfloor wheel lathe can be adjusted to wheel sets with different track widths by the two-part configuration of the machine stand and the displaceability of the two parts of the machine stand relative to one another. This is because the friction rollers, which support the wheel discs of the wheel set, are supported on two roller carriers, which are connected to in each case one of the two parts of the machine stand. A change of the distance between the two parts of the machine stand therefore results in the distance of the roller carriers connected thereto and the friction rollers supported thereon also changing. Since both parts of the machine stand are connected to one another by the crossbeam, the relative displaceability of the two parts of the machine stand can be achieved for example by a length change of the crossbeam (e.g. telescopically slidable into one another) or achieved as a result of the crossbeam being movably or displaceably supported on at least one of the two parts of the machine stand. This solution has in particular the advantage that the roller carrier does not have to be displaced in the transverse direction relative to the machine stand when the track width is changed. This for example has constructive advantages since the roller carriers usually already have to be displaceable in the vertical direction in order to be able to adjust to wheel discs with different diameters.

Advantageous configurations of the underfloor wheel set processing machine, in particular the underfloor wheel lathe are described in the dependent claims:

According to a first configuration of the underfloor wheel set processing machine, in particular the underfloor wheel lathe provision is made for at least one part of the machine stand to be displaceable relative to the crossbeam in the transverse direction. The underfloor wheel lathe can be adjusted to wheel sets with different track width by the displaceable support of at least one part of the machine stand relative to the crossbeam. An advantage of this solution is that the other part of the machine stand can be rigidly or fixedly connected to the crossbeam and that the crossbeam itself does not have to be changeable in length. The movable part of the machine stand can preferably be clamped in the desired position with the crossbeam. In spite of the movability of the movable part of the machine stand, this allows a rigid connection to be produced between the movable part of the machine stand and the crossbeam. Clamping also allows the set track width to be precisely maintained during the processing of the wheel sets.

A further configuration of the underfloor wheel set processing machine, in particular the underfloor wheel lathe provides for both parts of the machine stand to be displaceable in the transverse direction relative to the crossbeam. By not only one part of the machine stand, but both parts of the machine stand being displaceable relative to the crossbeam, larger track width differences can be bridged such that wheel sets with the most varied track widths can be processed. Both movable parts of the machine stand can preferably be clamped in the desired positions with the crossbeam. In spite of the movability of the movable parts of the machine stand, this allows a rigid connection to be produced between the movable parts of the machine stand and the crossbeam. Clamping also allows the set track width to be precisely maintained during the processing of the wheel sets.

According to a further embodiment of the underfloor wheel set processing machine, in particular the underfloor wheel lathe, provision is made for at least one of the two parts of the machine stand to have a guide to displaceably support the crossbeam. A guide is a constructively simple and particular precise solution for the object of changing the position of the crossbeam relative to the machine stand (or to one of its parts). The guide may in particular be a linear guide which ensures that only the distance in the transverse direction is linearly change, while other undesired movements (e.g. tilting or swivel movements) are prevented. The guide preferably has a clamping device to clamp the crossbeam. In spite of the displaceable support of the crossbeam, this allows a rigid connection to be produced between the guide and the crossbeam. The clamping device also allows the set track width to be precisely maintained during the processing of the wheel sets.

According to a further configuration of the underfloor wheel set processing machine, in particular the underfloor wheel lathe, provision is made for both parts of the machine stand to in each case have a guide to displaceably support the crossbeam. By both parts of the machine stand having their own guide to displaceably support the crossbeam, larger track width differences can be bridged such that wheel sets with the most varied track widths can be processed. Both guides preferably have a clamping device to clamp the crossbeam. In spite of the displaceable support of the crossbeam, this allows a rigid connection to be produced between the guides and the crossbeam. The clamping devices also allow the set track width to be precisely maintained during the processing of the wheel sets.

According to a further embodiment of the underfloor wheel set processing machine, in particular the underfloor wheel lathe, provision is made for at least one of the two parts of the machine stand to have a support for displacement in the transverse direction. The support serves the purpose of being able to displace in the transverse direction at least one part of the machine stand relative to the ground on which the machine stand is located. The support is preferably arranged on the underside of the machine stand (or the movable part of the machine stand). The support can be designed in one part or multiple parts. A one-part support can for example be formed by a roller which is fastened to the underside of the movable part of the machine stand. A multi-part support can for example be formed by two components, wherein the first component (e.g. a rail) is arranged on the ground or floor and with the second component (e.g. the guide element) being fastened to the underside of the movable part of the machine stand. The support preferably has a clamping device for clamping the movable part of the machine stand in the desired position. The clamping device also allows the set track width to be precisely maintained during the processing of the wheel sets.

According to a further embodiment of the underfloor wheel set processing machine, in particular the underfloor wheel lathe, provision is made for both parts of the machine stand to in each case have a support for displacement in the transverse direction. By both parts of the machine stand having their own support for displacement of the corresponding part of the machine stand in the transverse direction, larger track width differences can be bridged such that wheel sets with the most varied track widths can be processed. Both supports preferably have a clamping device for clamping the movable parts of the machine stand in the desired position. The clamping device also allows the set track width to be precisely maintained during the processing of the wheel sets.

According to a further embodiment of the underfloor wheel set processing machine, in particular the underfloor wheel lathe, provision is made for a roller carrier to be assigned to the first part of the machine stand and for the other roller carrier to be assigned to the second part of the machine stand. In particular, provision can be made for a roller carrier to be fastened to the first part of the machine stand and for the other roller carrier to be fastened to the second part of the machine stand. It preferably concerns a fastening immovable in the transverse direction. In this way, it is ensured that a change of the position of the parts of the machine stand in the transverse direction leads to a corresponding change of the position of the roller carrier in the transverse direction. The roller carriers therefore do not need to be movable relative to the machine stand, but rather can be supported immovably in any case in the transverse direction.

A further embodiment of the underfloor wheel set processing machine, in particular the underfloor wheel lathe provides for at least two friction rollers being rotatably supported on the first roller carrier and for at least two friction rollers being rotatably supported on the second roller carrier. Through the rotatable support of the friction rollers, the wheel set supported on the friction rollers can be turned and its wheel discs and/or its brake disc can therefore be processed along the entire circumference. By two friction rollers being provided on each roller carrier, wheel discs with different diameters can be supported by these same friction rollers.

According to a further embodiment of the underfloor wheel set processing machine, in particular the underfloor wheel lathe, provision is made for the underfloor wheel set processing machine, in particular the underfloor wheel lathe to have at least one drive to adjust the distance between both parts of the machine stand. A drive has, unlike a manual adjustment, the advantage of quick and secure adjustability by the operator. Regarding this configuration, it is further proposed for the drive to have a hydraulic cylinder. Hydraulic drives have the advantage of being able to easily generate large forces, having a high position accuracy and having a long service life.

According to a further embodiment of the underfloor wheel set processing machine, in particular the underfloor wheel lathe, provision is lastly made for an adjustment range in the range of up to 700 mm to be achievable by the displacement of one and/or both parts of the machine stand, in particular an adjustment range in the range of between 50 mm and 700 mm to be achievable. Many internationally standard track widths can be covered by this adjustment range.

BRIEF DESCRIPTION OF THE DRAWINGS

The invention is explained further below using a drawing merely representing a preferred exemplary embodiment. In the drawing.

DESCRIPTION OF THE INVENTION

Figure 1:
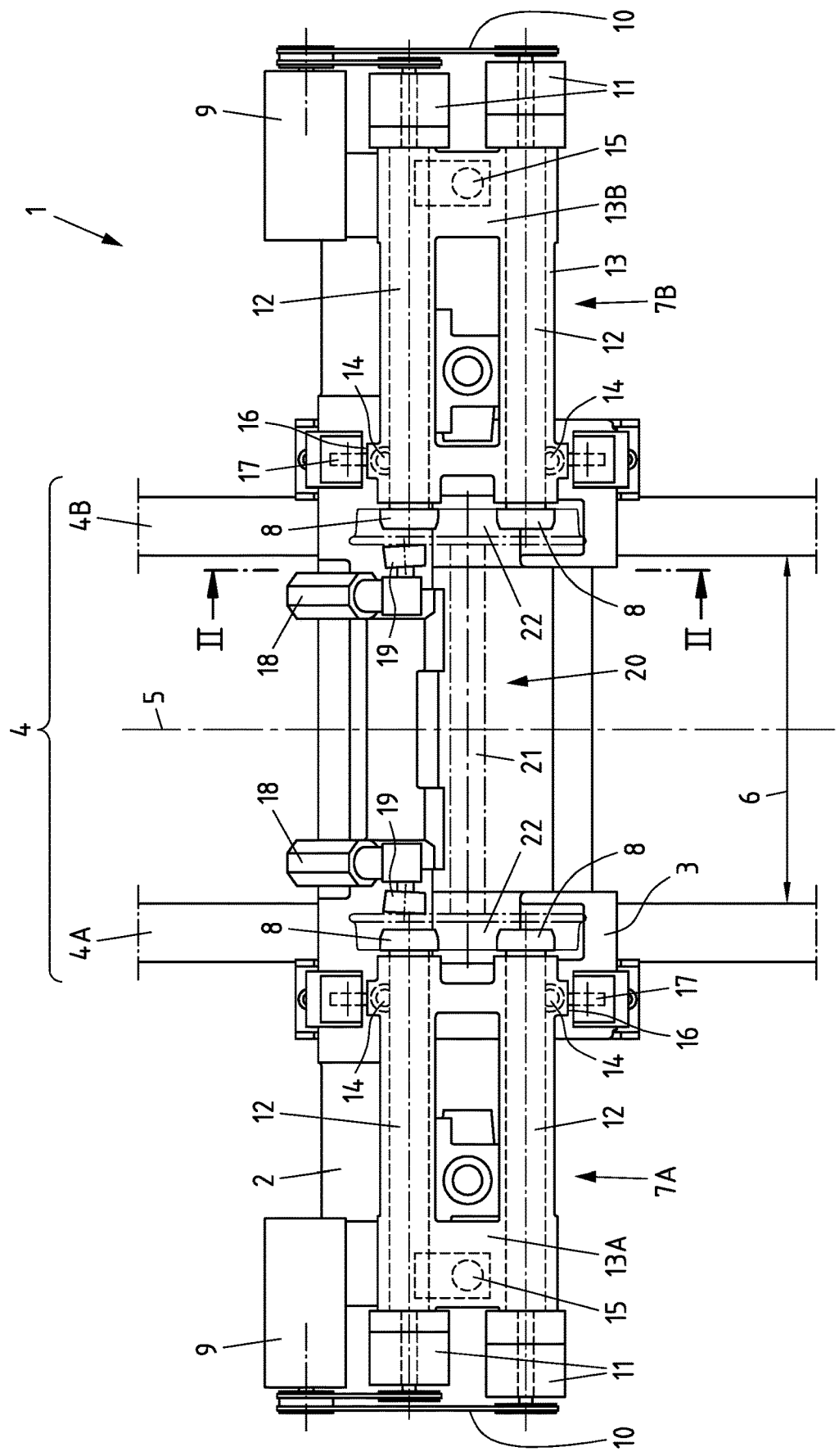
FIG. 1: shows an underfloor wheel lathe in a top view known from the prior art.

FIG. 1 shows an underfloor wheel lathe 1 in a top view known from the prior art. The underfloor wheel lathe 1 shown has a crossbeam 2 which is supported on a one-part (in FIG. 1 largely concealed) machine stand 3. The machine stand 3 can be placed on a workshop floor and is therefore stationary and not displaceable. Furthermore, a track 4 made of two rails 4A, 4B is illustrated which run parallel to one another and form a central axis 5. The distance between the inner edges of the two rails 4A, 4B is designated as the track width 6. The crossbeam 2 runs roughly at a right angle to the two rails 4A, 4B and to their central axis 5. The underfloor wheel lathe 1 has two roller carriers 7A, 7B which are arranged at opposing ends of the machine stand 3. Two friction rollers 8 are rotatably supported on each of the two roller carriers 7A, 7B. The friction rollers 8 are driven via a friction roller drive 9, which transfers its drive power via a belt drive 10, two gears 11 and two shafts 12 to the two friction rollers 8. The roller carriers 7A, 7B in each case have a housing 13A, 13B in which the shafts 12 are rotatably supported.

The two roller carriers 7A, 7B are supported in the vertical direction at three points, namely in each case on two vertical rods 14 (internally) and on a bracket 15 (externally). The two roller carriers 7A, 7B also in each case have two guide surfaces 16 which can roll on the rollers 17 which are provided on the transverse beam 2 or on the machine stand 3. The support of the roller carriers 7A, 7B is explained in further detail in connection with FIG. 2. The underfloor wheel lathe 1 shown in FIG. 1 also has two holders 18 on which in each case one axial guide roller 19 is rotatably supported. A wheel set 20 can be processed on the underfloor wheel lathe shown in FIG. 1, which comprises a wheel set shaft 21 and two wheel discs 22 in the case represented by way of example. The wheel set 20 can also comprise brake discs which are not represented in FIG. 1 for the sake of clarity.

Figure 2:
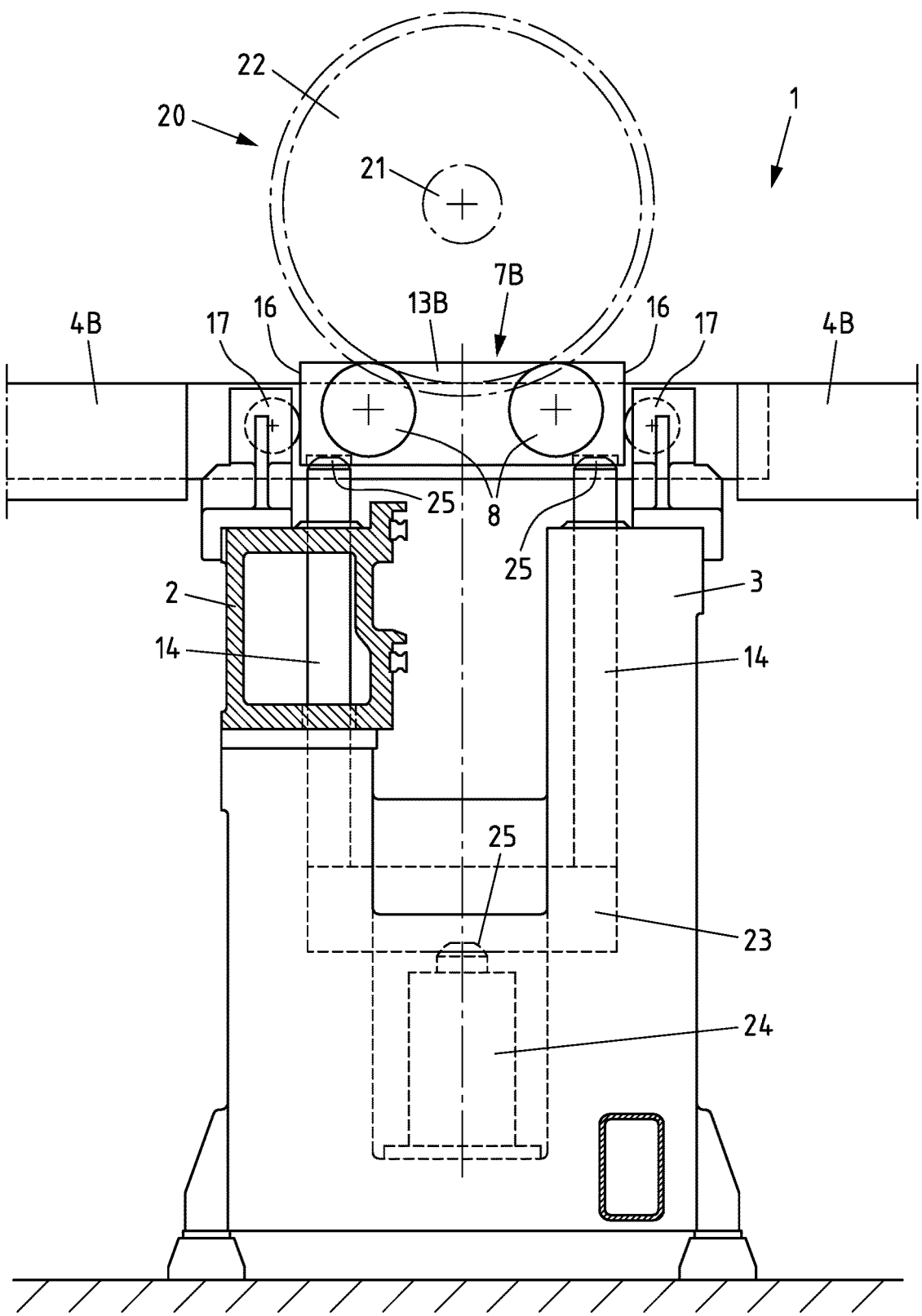
FIG. 2: shows the underfloor wheel lathe from FIG. 1 in a sectioned view along the cut plane II-II illustrated in FIG. 1, FIG. 3A: shows an underfloor wheel lathe according to the invention in a first position in a frontal view.

The underfloor wheel lathe 1 from FIG. 1 is represented in FIG. 2 in a sectioned view along the cut plane II-II illustrated in FIG. 1. The regions of the underfloor wheel lathe 1, which have already been described in relation to FIG. 1, are provided in FIG. 2 and all other figures with corresponding reference numerals. In the sectioned view, the roughly rectangular cross-section of the crossbeam 2 is easily discernible. In addition, it is clear in the view selected in FIG. 2 that the wheel discs 22 of the wheel set 20 are supported by the two friction rollers 8 and a rotation of the wheel discs 22 takes place through the rotation of the friction rollers 8. The support of the housing 13B of the roller carrier 7B on the two vertical rods 14 is also clearly discernible. The two vertical rods 14 are connected to one another in their lower region by a yoke 23. The yoke 23 can be displaced, i.e. raised and lowered in the vertical direction by a stroke cylinder 24 connected to the machine stand 3. Through this vertical movement, the roller carrier 7B and the friction rollers 8 supported thereon are also displaced in the vertical direction which allows for an adjustment of the underfloor wheel lathe 1 to wheel discs 22 with different diameters. The connection between the housing 13B of the roller carrier 7B and the vertical rods 14 takes place just like the connection between yoke 23 and stroke cylinder 24 via suitable joints 25. The principle of the positioning of the roller carrier 7B in the direction of the rail 4B is also discernible: the roller carrier 7B has two guide surfaces 16 which can roll on rollers 17 which are provided on the transverse beam 2 or the machine stand 3. In order to place the wheel set 20 on the friction rollers 8, the rail 4B (just like the rail 4A not represented) is interrupted in the region of the friction roller 8 and can be retracted and extended telescopically there.

Figure 3A:
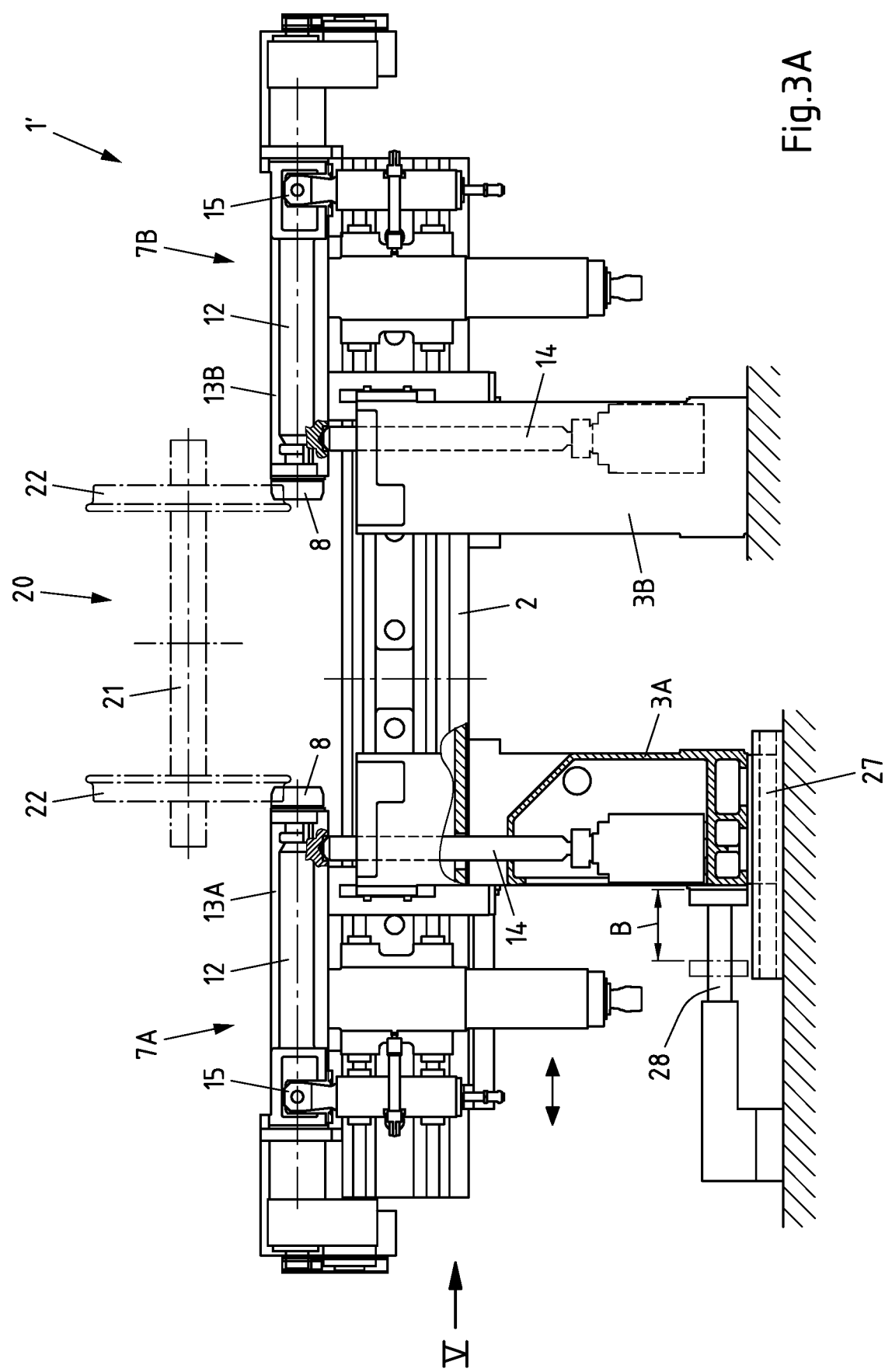
FIG. 3B: shows the underfloor wheel lathe from FIG. 3A in a second position in a frontal view.
Figure 3B:
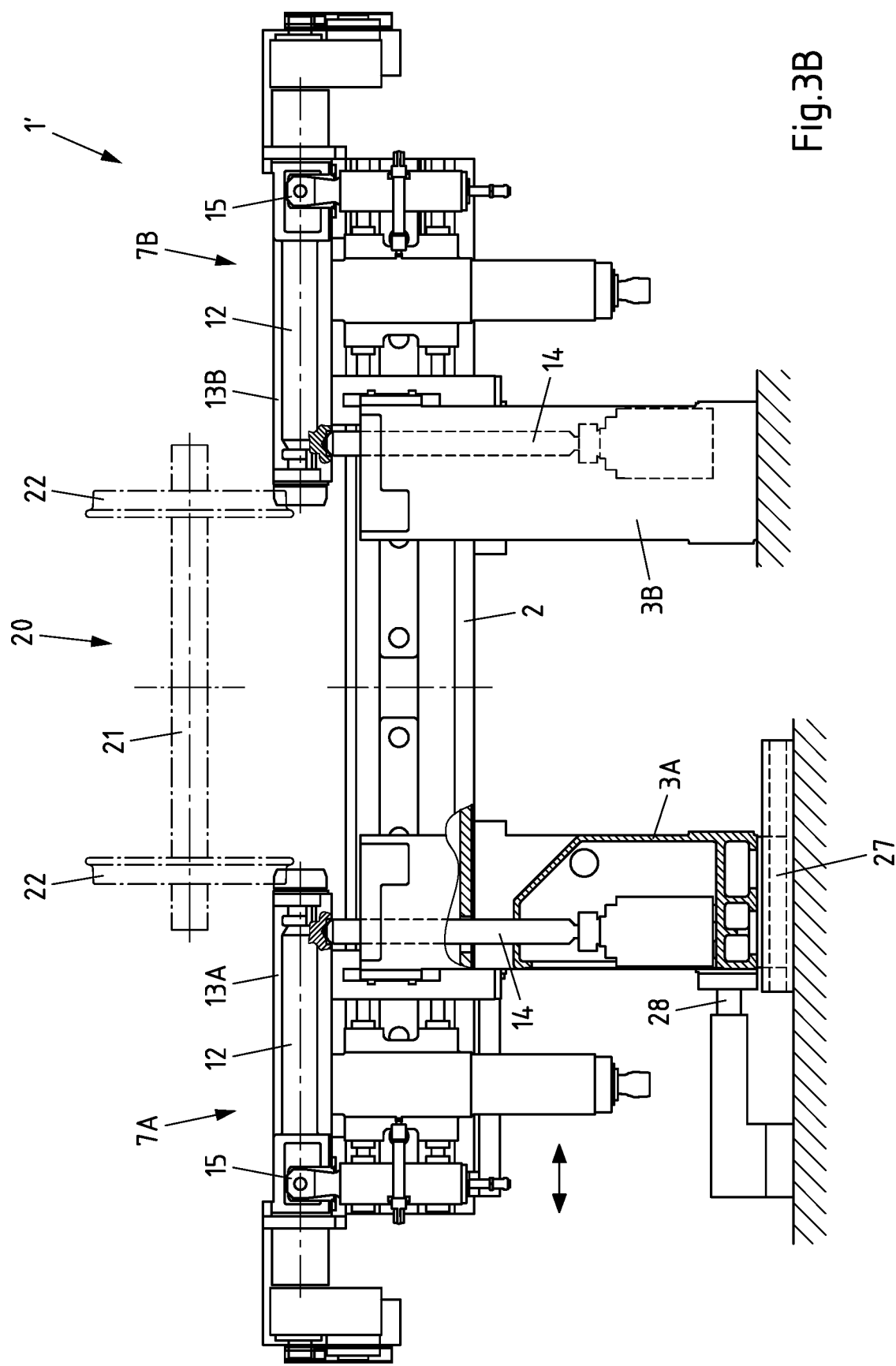
Figure 4A:
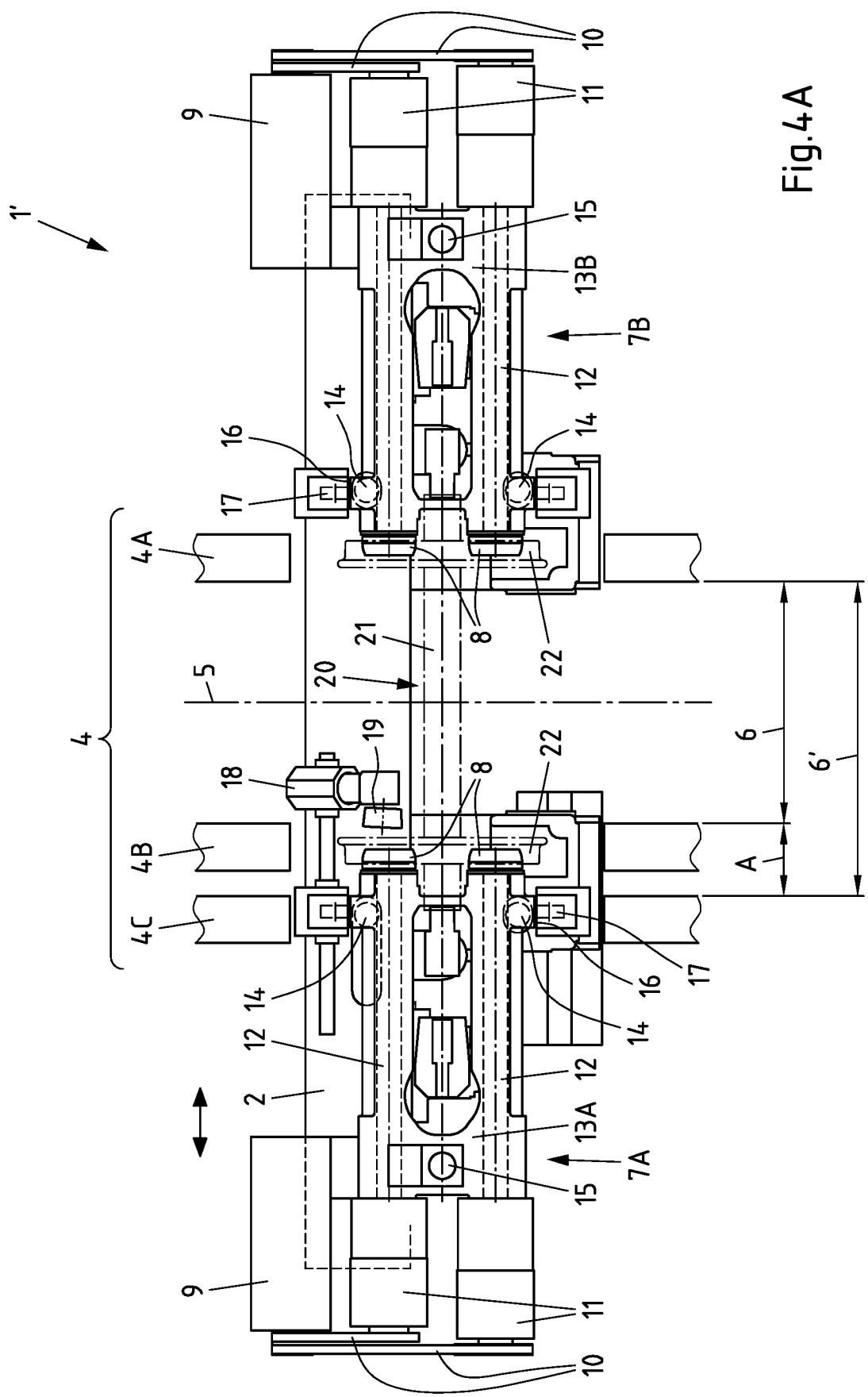
FIG. 4A: shows the underfloor wheel lathe from FIG. 3A in a top view.
Figure 4B:
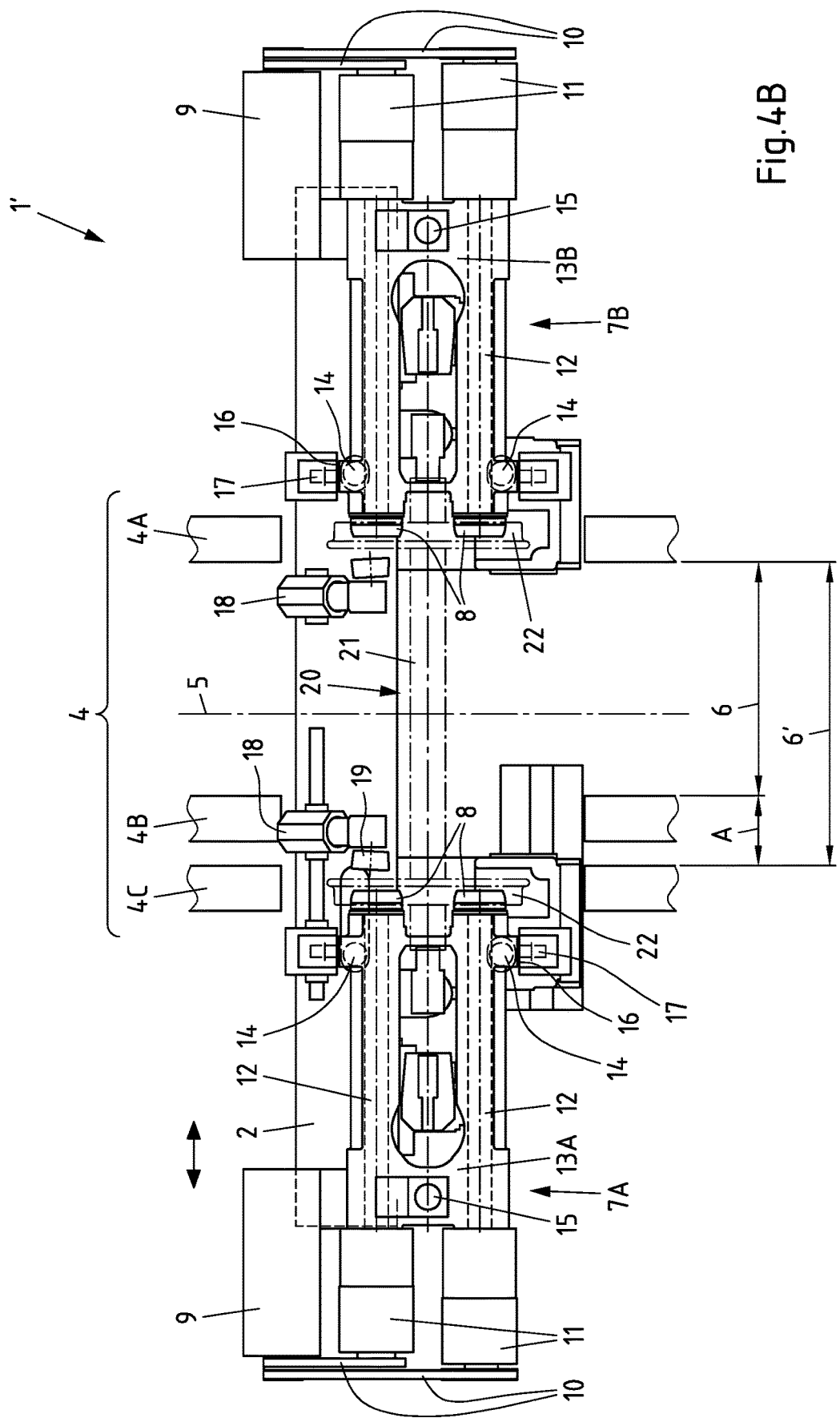
FIG. 4B: shows the underfloor wheel lathe from FIG. 3B in a top view.

FIG. 3A shows an underfloor wheel lathe 1' according to the invention in a first position in a frontal view. The underfloor wheel lathe 1' from FIG. 3A is shown in FIG. 3B in a second position in frontal view. FIG. 4A shows the underfloor wheel lathe 1' from FIG. 3A in a top view. The underfloor wheel lathe 1' from FIG. 3B is represented in FIG. 4B in a top view. The regions of the underfloor wheel lathe 1', which have already been described in relation to the underfloor wheel lathe 1 from FIG. 1 and FIG. 2, are provided in FIG. 3A to FIG. 4B with corresponding reference numerals. The underfloor wheel lathe 1' shown in FIG. 3A to FIG. 4B differs in particular from the previously described underfloor wheel lathe 1 in that at least one part 3A of the machine stand 3 is displaceable relative to the crossbeam 2 in the transverse direction. The direction of the displaceability is schematically represented by a double arrow. The other part 3B of the machine stand 3 is also preferably displaceable relative to the crossbeam 2 in the transverse direction (not represented in the figures).

In the case of the position shown in FIG. 3A and in FIG. 4A, the first part 3A of the machine stand 3 (and the roller carrier 7A supported thereon) is displaced inwards (i.e. in the direction of the second part 3B of the machine stand 3) such that the wheel sets 20 with smaller track width 6 can be processed (corresponds to rail 4B). In the case of the position shown in FIG. 3B and in FIG. 4B, the first part 3A of the machine stand 3 (and the roller carrier 7A supported thereon) is, in contrast, displaced outwards such that wheel sets 20 with greater track width 6' can be processed (corresponds to rail 4C). There is a track width difference A between both track widths 6, 6'.

The displaceability of the first part 3A of the machine stand 3 is achieved by the first part 3A of the machine stand 3 having a guide 26A for displaceably supporting the crossbeam 2. The guide of the crossbeam 2 is described in greater detail in relation to FIG. 5. The displaceability of the first part 3A of the machine stand 3 is also achieved in that the first part 3A has a support 27 which allows a displacement of the first part 3A of the machine stand 3 relative to the ground or floor in the transverse direction. A drive 28 can be provided for the displacement of the first part 3A of the machine stand 3 in the transverse direction, which can for example have a hydraulic cylinder. The first part 3A of the machine stand 3 has an adjustment range B which is at least as large as the track width difference A.

Figure 5:
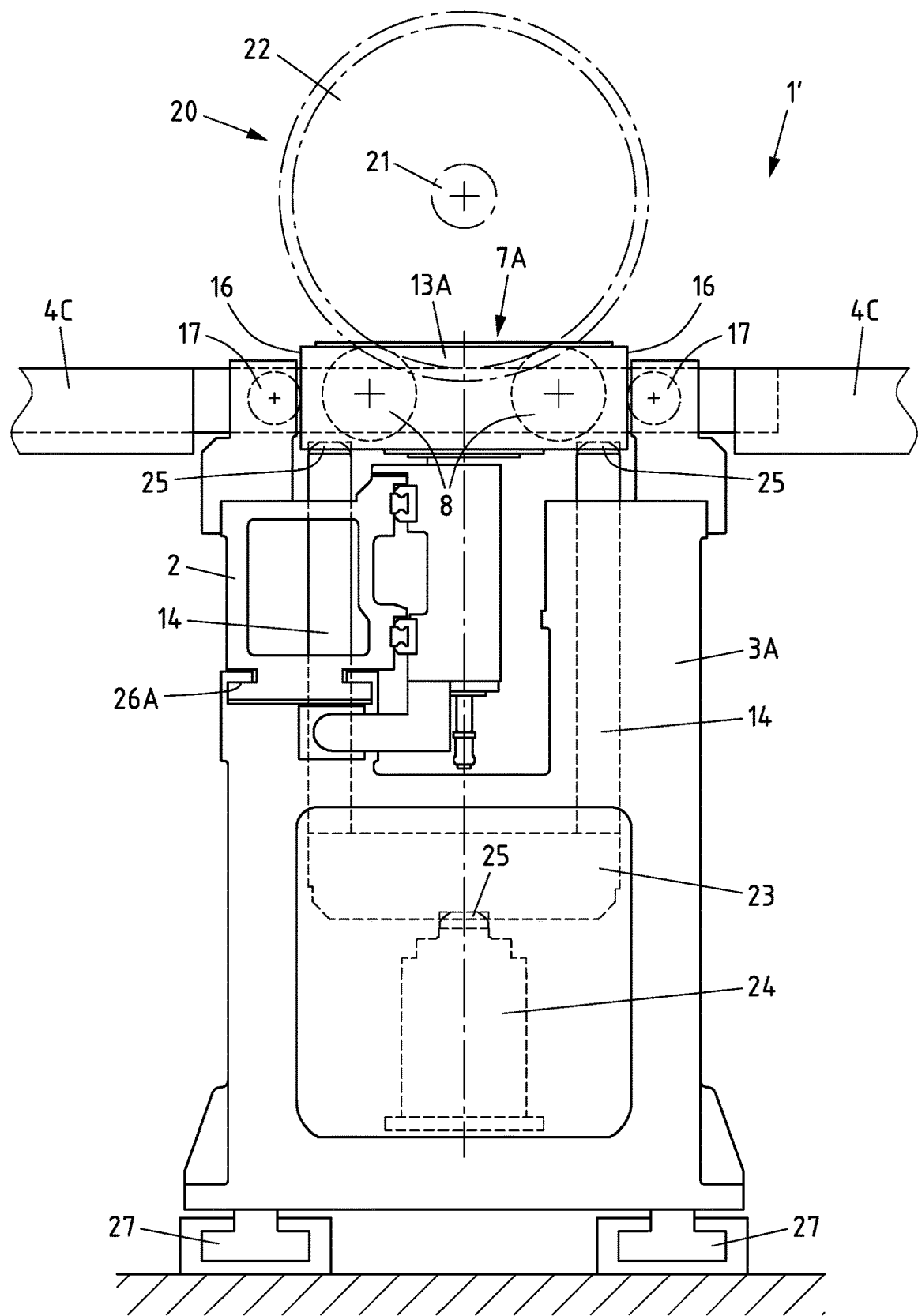
FIG. 5: shows the underfloor wheel lathe from FIG. 3A in a side view from the viewing direction V illustrated in FIG. 3A.

In FIG. 5, the underfloor wheel lathe 1' from FIG. 3A is represented in a side view from the viewing direction V illustrated in FIG. 3A. The regions of the underfloor wheel lathe 1' which have already been described in relation to the underfloor wheel lathe 1 from FIG. 1 and FIG. 2 or in relation to the underfloor wheel lathe 1' from FIG. 3A to FIG. 4B, are provided in FIG. 5 with corresponding reference numerals. In the view represented in FIG. 5, the displaceable support of the first part 3A of the machine stand 3 relative to the crossbeam 2 is particularly easily discernible: on the one hand, the first part 3A of the machine stand 3 has a guide 26A in which the crossbeam 2 is movably guided in the transverse direction. The guide 26A can in particular be configured as a linear guide such that the first part 3A of the machine stand 3 can only be displaced linearly (in the transverse direction). In addition, the first part 3A of the machine stand 3 has on its underside two supports 27 by way of which the first part 3A of the machine stand 3 can be moved relative to the ground or floor. The support 27 can also in particular be designed such that the first part 3A of the machine stand 3 can only be displaced linearly (in the transverse direction).

In the case of the previously described exemplary embodiment of the underfloor wheel lathe 1', only the first part 3A of the machine stand 3 is displaceable relative to the crossbeam 2 (and relative to the ground). Alternatively or additionally, provision can be made for the second part 3B of the machine stand 3 to be displaceable relative to the crossbeam 2 (and relative to the ground). To this end, the same means (guide 26, support 27, drive 28) or other suitable means can be provided.

LIST OF REFERENCE NUMERALS 1, 1': underfloor wheel lathe
2: crossbeam
3: machine stand
3A, 3B: first part or second part (of the machine stand 3)
4: track
4A, 4B, 4C rails
5: central axis
6, 6': track width
7A, 7B: roller carrier
8: friction roller
9: friction roller drive
10: belt drive
11: gear
12: shaft
13A, 13B: housing (of the roller carrier 7A, 7B)
14: vertical rod
15: bracket
16: guide surface
17: roller
18: holder
19: axial guide roller
20: wheel set
21: wheel set shaft
22: wheel disc
23: yoke
24: stroke cylinder
25: joint
26A, 26B: guide
27: support
28: drive A: track width difference
B: adjustment range

The invention claimed is:

1. An underfloor wheel set processing machine, in particular an underfloor wheel lathe for reprofiling wheels and brake discs of wheel sets of rail vehicles, comprising:
- a machine stand,
- a crossbeam for bridging a workshop track with at least two rails in the transverse direction,
- two roller carriers,
- at least four friction rollers,
- at least one friction roller drive to drive the friction rollers, and
- at least one axial guide roller to axially guide the wheel set,
- wherein the machine stand has a first part and a second part,
- wherein the crossbeam is supported on both parts of the machine stand,
- wherein the roller carriers are movably connected to the machine stand,
- wherein the friction rollers are rotatably supported on the roller carrier, and
- wherein the first part of the machine stand and the second part of the machine stand are displaceable relative to one another in the transverse direction,
- characterised in that at least one of the two parts of the machine stand has a guide to displaceably support the crossbeam, said guide having a clamping device to clamp the crossbeam.

2. The underfloor wheel set processing machine, in particular an underfloor wheel lathe according to claim 1, characterised in that at least one part of the machine stand is displaceable relative to the crossbeam in the transverse direction.

3. The underfloor wheel set processing machine, in particular an underfloor wheel lathe according to claim 1, characterised in that both parts of the machine stand are displaceable relative to the crossbeam in the transverse direction.

4. The underfloor wheel set processing machine, in particular an underfloor wheel lathe according to claim 1, characterised in that both parts of the machine stand have in each case a guide to displaceably support the crossbeam.

5. The underfloor wheel set processing machine, in particular an underfloor wheel lathe according to claim 1, characterised in that at least one of the two parts of the machine stand has a support for displacement in the transverse direction.

6. The underfloor wheel set processing machine, in particular an underfloor wheel lathe according to claim 1, characterised in that both parts of the machine stand in each case have a support for displacement in the transverse direction.

7. The underfloor wheel set processing machine, in particular an underfloor wheel lathe according to claim 1, characterised in that one roller carrier is assigned to the first part of the machine stand and in that the other roller carrier is assigned to the second part of the machine stand.

8. The underfloor wheel set processing machine, in particular an underfloor wheel lathe according to claim 1, characterised in that at least two friction rollers are rotatably supported on the first roller carrier and in that at least two friction rollers are rotatably supported on the second roller carrier.

9. The underfloor wheel set processing machine, in particular an underfloor wheel lathe according to claim 1, characterised in that the underfloor wheel lathe has at least one drive (28) to adjust the distance between both parts of the machine stand.

10. The underfloor wheel set processing machine, in particular an underfloor wheel lathe according to claim 9, characterised in that the drive (28) has a hydraulic cylinder.

11. The underfloor wheel set processing machine, in particular an underfloor wheel lathe according to claim 1, characterised in that an adjustment range of up to 700 mm is achievable by the displacement of one and/or both parts of the machine stand, in particular an adjustment range in the range of between 50 mm and 700 mm is achievable.

\* \* \* \* \*